July 11, 1939.         C. L. HALL         2,166,052
FASTENER ATTACHING PLATE FOR UPHOLSTERY INSTALLATIONS
Original Filed April 24, 1933    2 Sheets-Sheet 1
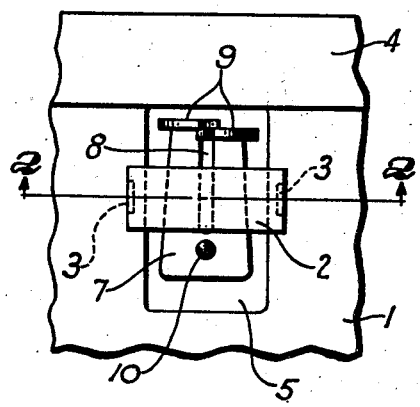
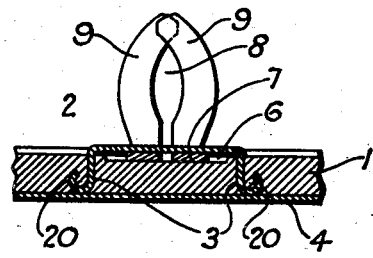
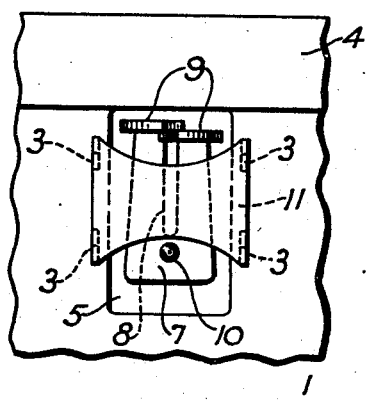
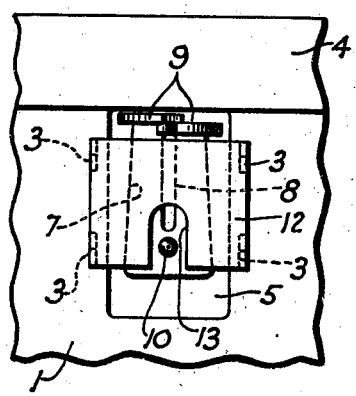
INVENTOR.
Charles L. Hall
BY
ATTORNEYS.

July 11, 1939.　　　　C. L. HALL　　　　2,166,052
FASTENER ATTACHING PLATE FOR UPHOLSTERY INSTALLATIONS
Original Filed April 24, 1933　　2 Sheets-Sheet 2
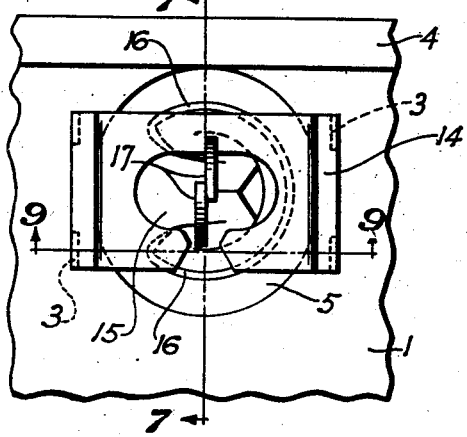
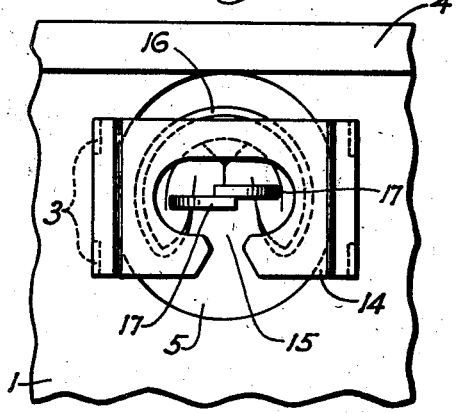
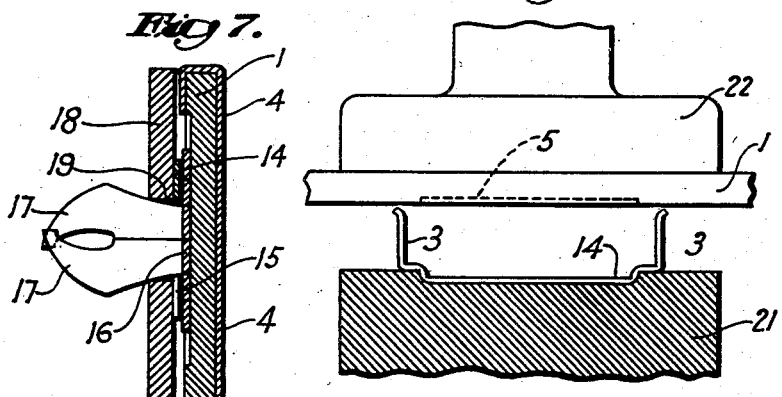
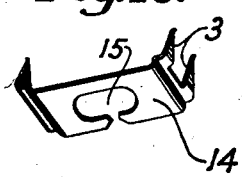
INVENTOR.
Charles L. Hall
BY
ATTORNEYS.

Patented July 11, 1939

2,166,052

UNITED STATES PATENT OFFICE 2,166,052

FASTENER ATTACHING PLATE FOR UPHOLSTERY INSTALLATIONS

Charles L. Hall, Detroit, Mich., assignor to United-Carr Fastener Corporation, Cambridge, Mass., a corporation of Massachusetts Original application April 24, 1933, Serial No. 667,588. Divided and this application March 9, 1938, Serial No. 194,938

5 Claims. (Cl. 85—49)

My invention relates to fastener attaching plates for use in upholstery installations, particularly to those wherein one part thereof, such as a card board or fibre board panel is secured to a supporting member by means of snap fastener members, and the invention aims generally to improve the construction of the fastener plates as well as the installation thereof to the panel.

Illustrative of certain preferred embodiments of the invention reference is made to the accompanying drawings wherein—

Fig. 1 is an elevation view of a portion of an upholstery panel and one form of snap fastener means;

Fig. 2 is a section taken on the line 2—2 of Fig. 1;

Fig. 3 is a view similar to that shown in Fig. 1, but showing a different form of attaching staple;

Fig. 4 is a view similar to that shown in Figs. 1 and 3, but showing another form of attaching staple;

Fig. 5 is a view similar to Fig. 1 showing a different form of stud member and cooperating attaching staple;

Fig. 6 is a view similar to Fig. 5 showing the fastener turned at a right angle from the position shown in Fig. 5;

Fig. 7 is a section taken on the line 7—7 of Fig. 5;

Fig. 8 is a rather schematic illustration of the manner in which any one of the various forms of staples may be attached to the upholstery backing;

Fig. 9 is a section taken on the line 9—9 of Fig. 5, showing the manner in which the prongs of the staple are embedded in the backing; and Fig. 10 is a perspective view of one of the fastener-attaching plates prior to attachment to the backing.

According to the features of the present invention as claimed herein, I provide a fastener attaching plate made of relatively stiff sheet metal, and having a body portion, which preferably is of substantial width and length to receive a stud fastener member. The body portion is provided with integrally formed flanged attaching prongs, which are relatively stiff so as to be capable of penetrating through the dense fiberboard panel without deflection thereby. The free ends of the prongs are pointed and slightly turned outwardly so that after they are pushed through the panel into engagement with a rigid flat surface engaging the opposite face of the panel, as for example a flat die, the prong ends will be deflected outwardly and backwardly into the panel body, with no portion of the prongs extending beyond the opposite face of the panel. This provides a secure and rigid attachment to the panel body without weakening the body in the region within the attaching prongs. It is essential that the prongs be of such stiffness as not to be deflected or curved by the resistance offered by the fiberboard panel, and also that the free ends of the prongs be initially bent outwardly so that the curvature of the reentering hooked ends may be controlled. Preferably the prongs are tapered to provide the necessary stiffness as well as the pointed penetrating ends therefor.

In the accompanying drawings I have shown several forms of fastener plates as well as fasteners adapted for attaching upholstery coverings to a supporting framework, as well as a simple and preferred manner of attaching the plates to the cardboard panel.

My improved fastener attaching members preferably comprise a body portion 2 adapted to be secured by means of attaching prongs to a panel 1 of dense fiberboard or cardboard, one surface of which is adapted to be covered with a suitable textile covering adhesively applied thereto.

The improved fastener plates are preferably constructed of sheet metal to provide a body portion of substantial area adapted to be secured in spaced relation to the panel 1. Preferably the body portion of the member 2 is of substantial width and approximately rectangular in shape and may advantageously be formed of relatively stiff sheet metal. Certain sides of the body portion, preferably the ends of the member 2, are flanged to present integral stiff attaching prongs 3 extending substantially perpendicularly to the body portion. It is essential that the attaching prongs 3 possess sufficient stiffness that they will penetrate the dense cardboard panel without deformation by the material of the panel, and to this end the prongs are advantageously tapered as shown in Fig. 10.

In Figs. 1 and 2 the attaching plate 2 has a substantially plain and flat body portion flanged at the ends to present tapered prongs 3 of less width than the body portion. A snap fastener member, substantially L-shaped in formation, is held in position between the cardboard panel 1 and attaching plate 2. The panel is preferably imperforate but may be provided with a recess 5 to provide a space 6 into which is fitted the base 7 of a stud fastener member. The recess 6 (see Fig. 1) is preferably of larger area than the base 7 of the steel fastener member to permit a certain amount of lateral shifting of the fastener so that it will align with a cooperating aperture in a supporting framework 18 (see Fig. 7). The angular extension of the fastener member is divided by a slot 8 extending throughout the length thereof and into the base 7 presenting in the angular extension a pair of relatively movable snap fastener arms 9. The base 7 may also be formed with a projection 10 adapted to engage an edge of the attaching member 2 and prevent accidental displacement of the fastener member.

In Figs. 3 and 4, I have shown attaching members each of which is provided with four attaching prongs 3, rather than two attaching prongs, provided on the narrower attaching member 2 illustrated in Fig. 1. The attaching plate 11 illustrated in Fig. 3 is wider at the ends than that shown in Fig. 1, but is cut away at opposite edges to provide a central portion which is substantially the same width as the plate member 2 illustrated in Fig. 1. With the improved construction illustrated in Fig. 3, the plate 11 is much more securely held in position than the plate 2, while the dimensions of the remainder of the structure remain about the same as the structure already described in connection with Figs. 1 and 2.

The attaching plate 12 illustrated in Fig. 4 is also secured in place by four attaching prongs 3, but instead of cutting away opposite sides of the plate portion, I have formed a slot 13 therein into which the projection 10 extends to permit lateral shifting of the stud relative to the attaching plate. With this construction, I secure the benefits of the full width of the plate portion of the attaching member 12.

In Figs. 5, 6 and 7 I have illustrated an attaching plate 14 also attached by four prongs 3. The snap fastener member held in position by the attaching plate 14 is of a different construction from the L-shaped fastener stud already described and is secured in position in a different manner from the L-shaped fastener. Therefore, I have provided a sort of keyhole-shaped aperture 15 in the plate 14 with the largest portion of the aperture 15 located substantially centrally of the plate portion and the narrow portion of the slot extending to one edge. The snap fastener stud member illustrated in Figs. 5, 6 and 7 is one well known scissors type as shown by the Johnson Patent No. 1,947,130, dated February 13, 1934, and has a base 16 and yieldable projections 17 extending from the central portion of the base.

The panel 1 may be provided with a depression 5, if desirable, the same as described in connection with the other installations but preferably the attaching plate 14 is arched substantially throughout its length so that that portion thereof which lies over the base of the fastener member will be spaced upwardly from the surface of the panel. In this manner I have provided the desired space between the panel 1 and the attaching member 14 for reception of the base 16 of the fastener stud. The stud is placed in position by entering the base into the space between the attaching member 14 and the form 1 and then sliding it laterally so that the projections 17—17 pass through the narrow portion of the aperture 15, as best illustrated in Fig. 5. Thereafter the fastener may be turned ninety degrees to a position shown in Fig. 6, where it is free to shift laterally in all directions because of the relative size of the enlarged portion of the aperture 15 to the projections 17—17.

In Fig. 7 I have shown a thin sheet metal structure or framework 18 having an aperture 19 therethrough through which the projections 17—17 extend to hold the upholstery structure in position. This is merely an example of the manner in which any one of the structures described may be secured in position to cover a framework or other suitable structure.

While the various attaching members for holding the different types of studs may be secured to the cardboard or like material in any suitable manner, I have found that they may be easily and quickly attached by automatic machinery, particularly when attaching prongs 3 are used. The manner in which I prefer to attach the fastener-holding attaching members, together with a preferred form of attaching plate and prongs, is best illustrated by Figs. 8 through 10 and the method of attachment will now be described.

I have found that the attaching plates may be very strongly attached to the form 1 by forcing them through the material of the form and then, as they reach the opposite surface, bending them outwardly and downwardly into a hook-shaped engagement with the hook-shaped portions 20 embedded in the material of the form 1, as best illustrated in Fig. 9. The best method of accomplishing the desired result, according to my invention, is initially to bend the sharp pointed ends of the tapered prongs 3 slightly outwardly, as illustrated in Figs. 8 and 10. During the attaching operation (Fig. 8), an attaching member 14 is held in position by a suitable die 21. The cardboard form 1 is placed against another die 22 preferably having a flat surface so that when the dies approach each other, the attaching prongs 3 are forced through the material of the form 1. As the prongs approach the opposite surface of the form 1, they are curled outwardly, downwardly and inwardly into embedded relation with the material of the form 1. The initial bend to the ends of the prongs insures them taking a hook-shaped form in the desired direction. By this construction, very slight, if any portions of the prongs are exposed at that surface of the cardboard form opposite the side where the attaching part is located. At any rate, that surface of the form 1 against which the covering material 4 is adhesively secured, remains smooth and uninterrupted by the attaching prongs. This is particularly important when it is desirable to make up structures which include only the cardboard backing and the relatively thin covering material adhesively applied to one side thereof without any interposed wadding material. With that type of structure, irregularities formed by other types of attachment shown in the surface of the adhesively applied fabric.

The above described construction of attaching members for securing the stud fasteners to the panel makes for a simple efficient and secure installation which has many advantages. As the fastener prongs are relatively stiff, as compared to the cardboard panel and penetrate the full thickness of the panel when they are caused to be curled back midway the thickness of the panel, a very secure attachment for securing the plates 2 is provided. Because all of the prongs are curled outwardly into the panel, by means of the initially outwardly bent free ends, that portion of the panel encompassed within the prongs of any one attaching plate is not weakened, as would be the case if the prongs curved inwardly.

Other advantages of the invention will be apparent to those skilled in the art.

The present application is a division of my copending application Serial No. 667,588, filed April 24, 1933.

While I have illustrated and described preferred embodiments of my invention, I do not wish to be limited thereby, because the scope of my invention is best defined by the following claims.

I claim:

1. A fastener attaching plate for attachment to a dense cardboard panel of an upholstery installation of the character described, said plate comprising a sheet metal body portion having flanged ends providing relatively stiff attaching prongs, said prongs being flat throughout substantially the length thereof, with the tip ends only slightly outwardly bent prior to application to the panel, whereby the prongs may be forced through the cardboard panel without deflection thereby but the outwardly bent tip ends being capable of deflecton by a flat rigid surface contacting the opposite face of the panel to produce outwardly hooked reentrant anchoring means embedded wholly in the panel.

2. A fastener attaching plate for attachment to a dense cardboard panel of an upholstery installation of the character described, said plate comprising a sheet metal body portion having flanged ends providing relatively stiff attaching prongs, said prongs being flat and tapered throughout substantially the length thereof with the pointed tip ends only slightly outwardly bent prior to application to the panel, whereby the prongs may be forced through the cardboard panel without deflection thereby but the outwardly bent tip ends being capable of deflection by a flat rigid surface contacting the opposite face of the panel to produce outwardly hooked reentrant anchoring means embedded wholly in the panel.

3. A fastener attaching plate for attachment to a dense cardboard panel of an upholstery installation of the character described, said plate comprising a sheet metal body portion having flanged ends providing a plurality of relatively stiff tapered attaching prongs at opposite ends of the body portion, said prongs being flat throughout substantially the length thereof, with the tip ends only slightly outwardly bent prior to application to the panel, whereby the prongs may be forced through the cardboard panel without deflection thereby but the outwardly bent tip ends being capable of deflection by a flat rigid surface contacting the opposite face of the panel to produce outwardly hooked reentrant anchoring means embedded wholly in the panel.

4. A fastener attaching plate for attachment to a dense cardboard panel of an upholstery installation of the character described, said plate comprising a slotted fastener receiving sheet metal body portion having flanged sides presenting panel bearing surfaces and integral relatively stiff tapered attaching prongs, said prongs being flat and tapered throughout substantially the length thereof with the pointed tip ends only slightly outwardly bent prior to application to the panel, whereby the prongs may be forced through the cardboard panel without deflection thereby but the outwardly bent tip ends being capable of deflection by a flat rigid surface contacting the opposite face of the panel to produce outwardly hooked reentrant anchoring means embedded wholly in the panel, said panel bearing surfaces serving to limit movement of the prongs through the panel and to maintain said reentrant anchoring means wholly confined therein.

5. A fastener attaching plate for attachment to a dense cardboard panel of an upholstery installation of the character described, said plate comprising a slotted fastener receiving sheet metal body portion having flanged sides presenting panel bearing surfaces and integral relatively stiff tapered attaching prongs, said prongs being flat and tapered throughout substantially the length thereof with the pointed tip ends only slightly outwardly bent prior to application to the panel, whereby the prongs may be forced through the cardboard panel without deflection thereby but the outwardly bent tip ends being capable of deflection by a flat rigid surface contacting the opposite face of the panel to produce outwardly hooked reentrant anchoring means embedded wholly in the panel, said panel bearing surfaces serving to limit movement of the prongs through the panel and to maintain said reentrant anchoring means wholly confined therein, the slotted opening in said body portion being elongated and of a width approximately one-half its length.

CHARLES L. HALL.